United States Patent
Barnes

Patent Number: 6,113,184
Date of Patent: Sep. 5, 2000

[54] BICYCLE SEAT ASSEMBLY

[76] Inventor: Samuel J. Barnes, 1014 Gardensgate Rd., Eutawville, S.C. 29048

[21] Appl. No.: 09/365,047

[22] Filed: Jul. 30, 1999

[51] Int. Cl.$^7$ .......................................................... B62J 1/02
[52] U.S. Cl. ........................... 297/208; 297/201; 297/214; 297/197; 297/198
[58] Field of Search ................................... 297/208, 201, 297/214, 197, 198

[56] References Cited

U.S. PATENT DOCUMENTS

| | | | |
|---|---|---|---|
| 289,272 | 11/1883 | Kirkpatrick | 297/201 X |
| 537,375 | 4/1895 | Wright et al. | 297/201 |
| 568,626 | 9/1896 | Pierce et al. | 297/201 |
| 569,981 | 10/1896 | Strakosch | 297/201 |
| 572,062 | 11/1896 | Peck | 297/201 |
| 575,509 | 1/1897 | Newell | 297/201 |
| 593,331 | 11/1897 | Noirit | 297/201 |
| 603,734 | 5/1898 | Peck et al. | 297/201 |
| 603,943 | 5/1898 | Clifford | 297/201 |
| 604,347 | 5/1898 | Bray | 297/201 |
| 605,151 | 6/1898 | Twist | 297/201 |
| 606,124 | 6/1898 | Craig | 297/201 X |
| 612,972 | 10/1898 | Leech | 297/201 X |
| 633,487 | 9/1899 | Radermacher | 297/201 |
| 636,312 | 11/1899 | Avery | 297/198 |
| 659,323 | 10/1900 | Richmond | 297/201 X |
| 2,188,153 | 1/1940 | Mesinger | 297/198 |
| 2,300,379 | 10/1942 | Faulhaber | 297/214 X |
| 3,131,969 | 5/1964 | Kalter | 297/214 |
| 3,588,171 | 6/1971 | Rich | 297/214 X |
| 3,756,653 | 9/1973 | Worley | 297/214 X |
| 3,758,154 | 9/1973 | Kitaguchi | 297/214 |
| 3,905,643 | 9/1975 | Lamkemeyer | 297/214 X |
| 4,850,643 | 7/1989 | Rollman | 297/214 |
| 4,999,068 | 3/1991 | Chiarella | 297/214 X |
| 5,252,373 | 10/1993 | Ganske et al. | 297/214 X |
| 5,330,249 | 7/1994 | Weber et al. | 297/214 |
| 5,340,192 | 8/1994 | Hsh | 297/197 |
| 5,823,618 | 10/1998 | Fox et al. | 297/201 |

*Primary Examiner*—Peter M. Cuomo
*Assistant Examiner*—Rodney B. White

[57] ABSTRACT

A bicycle seat assembly for promoting comfort for a male bicycle rider by permitting the scrotum to hang freely while the rider is seated on the bicycle. The bicycle seat assembly includes a housing member having a pair of spaced frontal projections, the housing member surrounding a cushioning member, the housing member being coupled to a spring assembly, the spring assembly being adapted for coupling to a seat post of a bicycle.

14 Claims, 3 Drawing Sheets

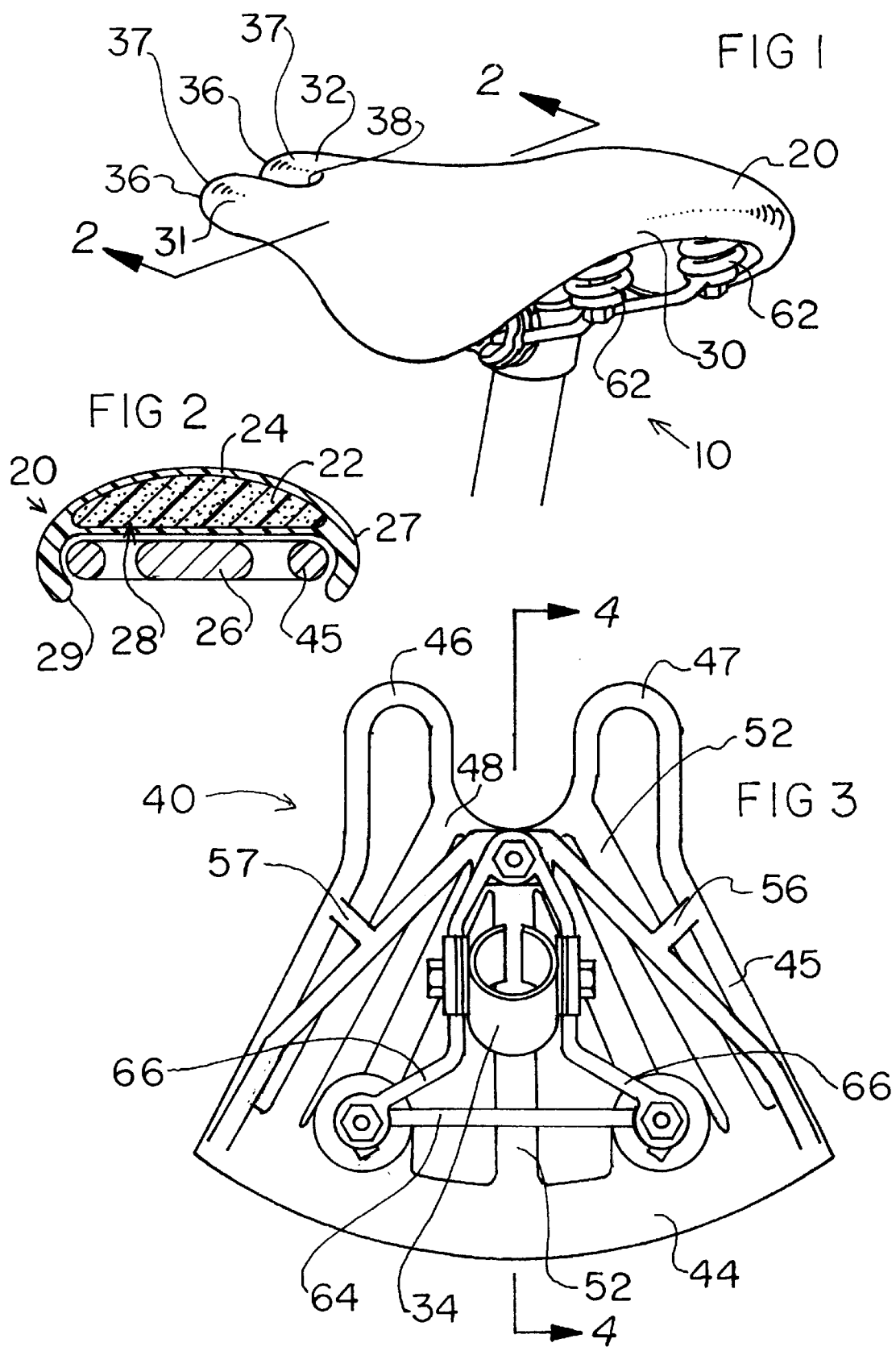

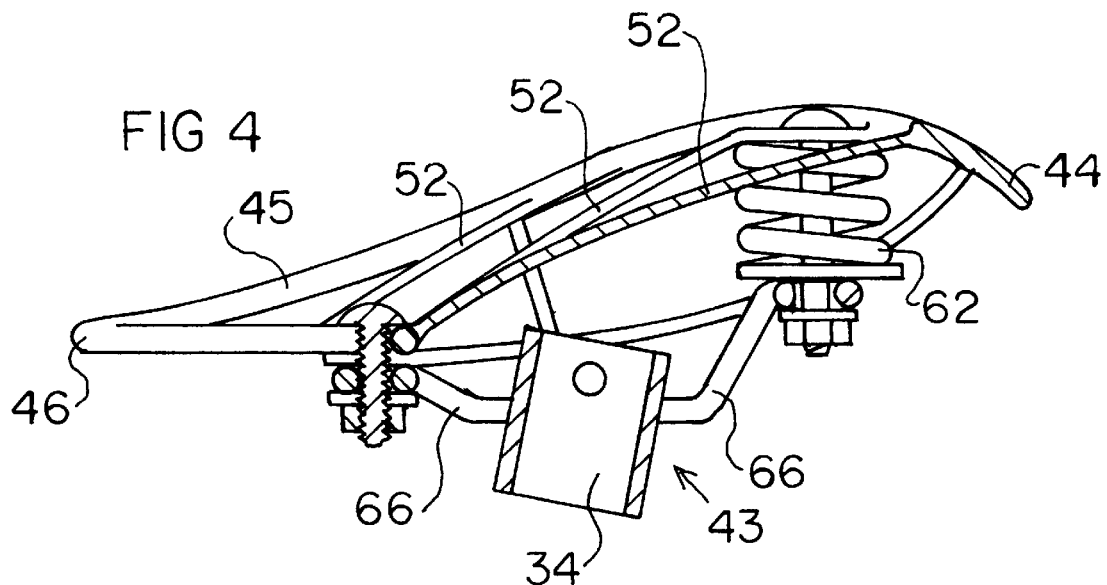
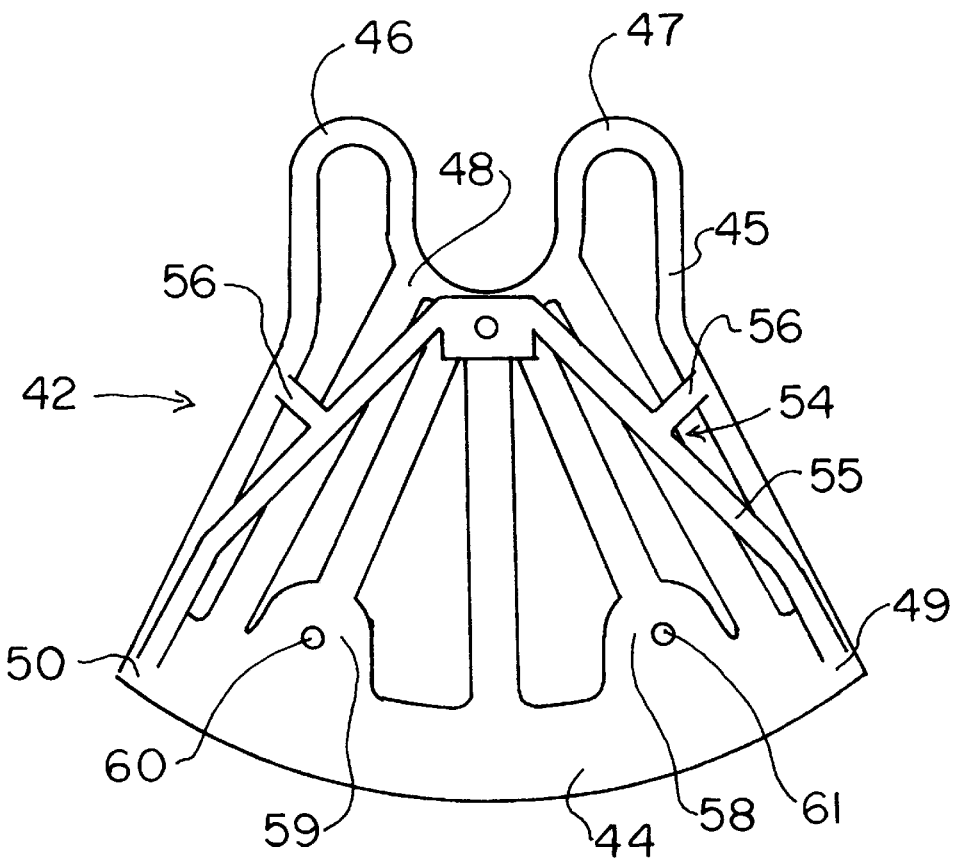

BICYCLE SEAT ASSEMBLY

BACKGROUND OF THE INVENTION

1. Field of the Invention

The present invention relates to bicycle seats and more particularly pertains to a new bicycle seat assembly for promoting comfort for a male bicycle rider by permitting the scrotum to hang freely while the rider is seated on the bicycle.

2. Description of the Prior Art

The use of bicycle seats is known in the prior art. More specifically, bicycle seats heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,429,915; U.S. Pat. No. 4,387,925; U.S. Pat. No. 3,874,730; U.S. Pat. No. 4,773,705; U.S. Pat. No. 3,997,214; and U.S. Pat. No. 4,176,880.

While these devices fulfill their respective, particular objectives and requirements, the aforementioned patents do not disclose a new bicycle seat assembly. The inventive device includes a housing member having a pair of spaced frontal projections, the housing member surrounding a cushioning member, the housing member being coupled to a spring assembly, the spring assembly being adapted for coupling to a seat post of a bicycle.

In these respects, the bicycle seat assembly according to the present invention substantially departs from the conventional concepts and designs of the prior art, and in so doing provides an apparatus primarily developed for the purpose of promoting comfort for a male bicycle rider by permitting the scrotum to hang freely while the rider is seated on the bicycle.

SUMMARY OF THE INVENTION

In view of the foregoing disadvantages inherent in the known types of bicycle seats now present in the prior art, the present invention provides a new bicycle seat assembly construction wherein the same can be utilized for promoting comfort for a male bicycle rider by permitting the scrotum to hang freely while the rider is seated on the bicycle.

The general purpose of the present invention, which will be described subsequently in greater detail, is to provide a new bicycle seat assembly apparatus and method which has many of the advantages of the bicycle seats mentioned heretofore and many novel features that result in a new bicycle seat assembly which is not anticipated, rendered obvious, suggested, or even implied by any of the prior art bicycle seats, either alone or in any combination thereof.

To attain this, the present invention generally comprises a housing member having a pair of spaced frontal projections, the housing member surrounding a cushioning member, the housing member being coupled to a spring assembly, the spring assembly being adapted for coupling to a seat post of a bicycle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new bicycle seat assembly apparatus and method which has many of the advantages of the bicycle seats mentioned heretofore and many novel features that result in a new bicycle seat assembly which is not anticipated, rendered obvious, suggested, or even implied by any of the prior art bicycle seats, either alone or in any combination thereof.

It is another object of the present invention to provide a new bicycle seat assembly that may be easily and efficiently manufactured and marketed.

It is a further object of the present invention to provide a new bicycle seat assembly that is of a durable and reliable construction.

An even further object of the present invention is to provide a new bicycle seat assembly which is susceptible of a low cost of manufacture with regard to both materials and labor, and which accordingly is then susceptible of low prices of sale to the consuming public, thereby making such bicycle seat assembly economically available to the buying public.

Still yet another object of the present invention is to provide a new bicycle seat assembly which provides in the apparatuses and methods of the prior art some of the advantages thereof, while simultaneously overcoming some of the disadvantages normally associated therewith.

Still another object of the present invention is to provide a new bicycle seat assembly for promoting comfort for a male bicycle rider by permitting the scrotum to hang freely while the rider is seated on the bicycle.

Yet another object of the present invention is to provide a new bicycle seat assembly which includes a housing member having a pair of spaced frontal projections, the housing member surrounding a cushioning member, the housing member being coupled to a spring assembly, the spring assembly being adapted for coupling to a seat post of a bicycle.

Still yet another object of the present invention is to provide a new bicycle seat assembly that permits the scrotum to hang freely while seated on a bicycle to prevent prostate related problems associated with prolonged use of traditional style bicycle seats.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new bicycle seat assembly according to the present invention.

FIG. 2 is a cross-sectional view of the present invention taken along line 2—2 of FIG. 1.

FIG. 3 is a bottom view of the spring assembly of the present invention.

FIG. 4 is a side view of the spring assembly of the present invention.

FIG. 5 is a bottom view of the support frame of the present invention.

DESCRIPTION OF THE PREFERRED EMBODIMENT

Figure 6:
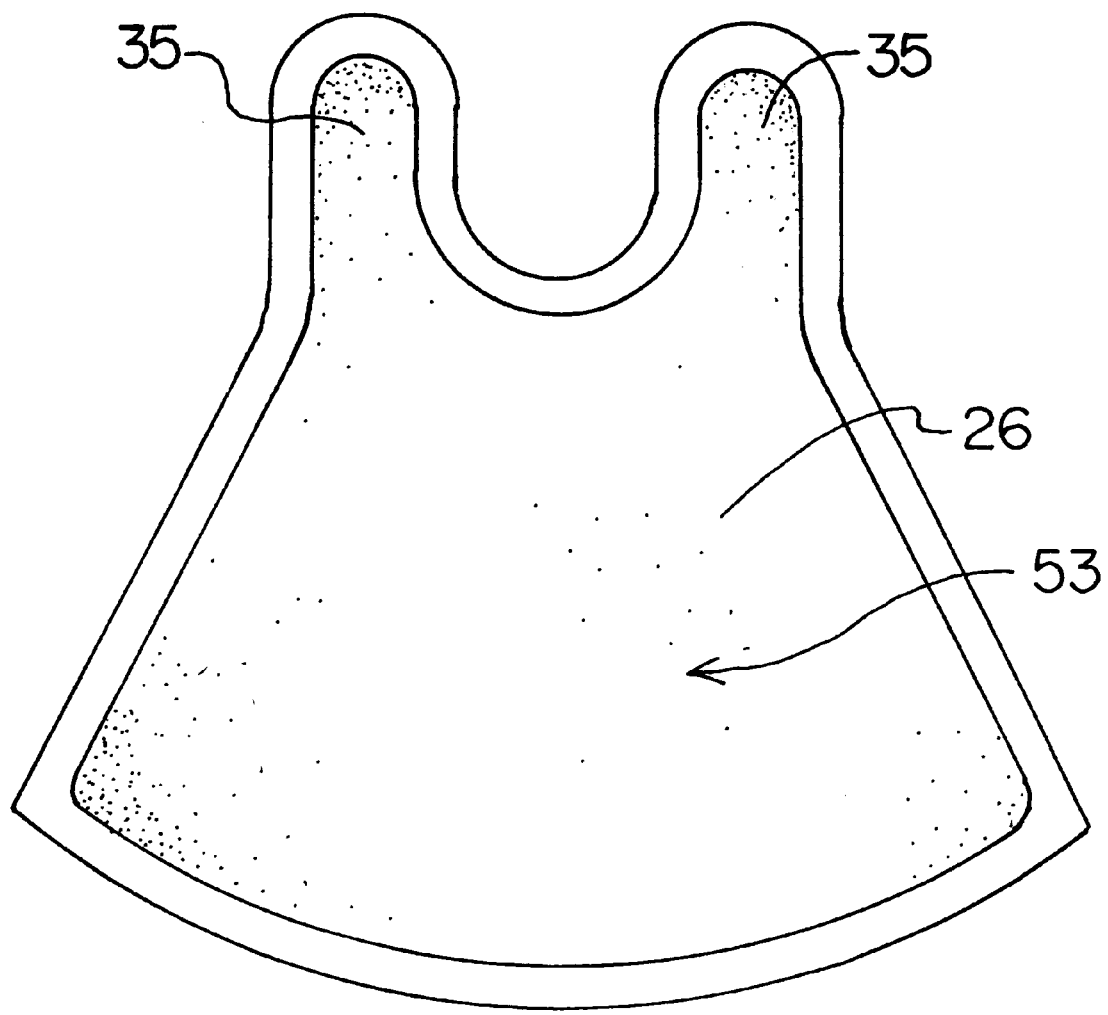
FIG. 6 is a bottom view of the housing member of the present invention.

With reference now to the drawings, and in particular to FIGS. 1 through 6 thereof, a new bicycle seat assembly embodying the principles and concepts of the present invention and generally designated by the reference numeral 10 will be described.

As best illustrated in FIGS. 1 through 6, the bicycle seat assembly 10 generally comprises a housing member 20, a cushioning member 22, and a spring assembly 40. The housing member includes an upper portion 24 and a lower portion 26. An outer perimeter edge 27 of the upper portion is coupled to the lower portion to form an interior space 28 between the upper portion and the lower portion.

The housing member further includes a peripheral edge 29 that includes a generally arcuate back portion 30 and a pair of frontal projections 31 and 32. The frontal projections are spaced with respect to each other such that the housing member is designed to permit a scrotum of a user to hang freely between the frontal projections when the user is seated on the housing member. Each of the frontal projections includes a generally planar lower face 35, a rounded distal end 36, and a generally curved upper face 37.

The peripheral edge of the housing member includes a generally arcuate front section 38 between the frontal projections 31 and 32.

The cushioning member 22 is positioned in the interior space of the housing member between the upper portion and the lower portion.

The spring assembly includes a clamping member 34 designed for coupling to a seat post of a bicycle.

The spring assembly includes a support frame 42 coupled to the lower portion of the housing and a main frame 43 coupled to the clamping member. The support frame includes a generally arcuate rear cross member 44 and a rigid elongate perimeter edge member 45. The perimeter edge member includes a pair of frontal protrusion support portions 46 and 47 and an inwardly arcuate spacing portion 48 positioned between the frontal protrusions support portions. The perimeter edge member extends outwardly from opposite ends 49 and 50 of the rear cross member and is positioned such that the rear cross member and the perimeter edge member substantially correspond to and support the peripheral edge of the housing member.

A plurality of leaf springs 52 are coupled between the rear cross member and the spacing portion of the perimeter edge member. The leaf springs are positioned such that they resiliently support an interior area 53 of a surface of the lower portion of the housing.

The support frame further includes a bracing assembly 54 extending outwardly from the rear cross member towards the spacing portion of the perimeter edge member. The bracing assembly includes a main brace member 55 and a pair of lateral brace members 56 and 57. The lateral brace members extend between the main brace member and the perimeter edge member of the support frame.

The rear cross member further includes a pair of spring support members 58 and 59. Each spring support member includes a respective aperture 60 and 61 that extends through the spring support member for coupling a cylindrical spring member 62 to the rear cross member.

The main support frame is coupled to each of the cylindrical spring members opposite the rear cross member and to the bracing assembly such that the clamping member is positioned beneath the support frame between the rear cross member and the perimeter edge member.

The main frame includes a spacing bar 64 that extends between the cylindrical spring members. The main frame also includes a pair of clamp arms 66. The clamping member is coupled between the clamp arms of the main frame. In an embodiment, the clamping member is pivotally coupled between the clamp arms such that the main frame is designed for permitting tilting of the main frame relative to the seat post of the bicycle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bicycle seat assembly for a bicycle having a seat post extending upwardly from a frame of the bicycle, the seat assembly comprising:

a housing member, the housing member having an upper portion and a lower portion, an outer perimeter edge of said upper portion being coupled to said lower portion to form an interior space between the upper portion and the lower portion;

said housing member further having a peripheral edge, said peripheral edge having a generally arcuate back portion and a pair of frontal projections, the frontal projections being spaced with respect to each other whereby the housing member is adapted to permit a scrotum of a user to hang freely between the frontal projections when the user is seated on the housing member;

a cushioning member being positioned in the interior space of the housing member, the cushioning member being positioned between the upper portion and the lower portion;

a spring assembly having a clamping member, the clamping member being adapted for coupling to the seat post of the bicycle;

said spring assembly having a support frame coupled to the lower portion of the housing and a main frame coupled to the clamping member, the spring assembly further having a plurality of cylindrical spring members coupled between the support frame and the main frame;

said support frame having a generally arcuate rear cross member and a rigid elongate perimeter edge member, said perimeter edge member having a pair of frontal protrusion support portions and an inwardly arcuate spacing portion positioned between said frontal protrusions support portions, said perimeter edge member extending outwardly from opposite ends of said rear cross member, said perimeter edge member being positioned such that said rear cross member and said perimeter edge member substantially correspond to and support said peripheral edge of said housing member; and said support frame further having a bracing assembly extending outwardly from said rear cross member towards said spacing portion of said perimeter edge member, said bracing assembly having a main brace member and a pair of lateral brace members, said lateral brace members extending between said main brace member and said perimeter edge member of said support frame.

2. The bicycle seat assembly of claim 1, further comprising:

each of said frontal projections having a generally planar lower face, a rounded distal end, and a generally curved upper face.

3. The bicycle seat assembly of claim 1, further comprising:

said peripheral edge of said housing member having a generally arcuate front section between said frontal projections.

4. The bicycle seat assembly of claim 1, further comprising:

said support frame of said spring assembly further having a plurality of leaf springs extending between a rear portion of said support frame and a front portion of said support frame, said leaf springs being positioned such that they resiliently support an interior area of a surface of said lower portion of said housing.

5. The bicycle seat assembly of claim 1, further comprising:

a plurality of leaf springs coupled between said rear cross member and said spacing portion of said perimeter edge member of said support frame.

6. A bicycle seat assembly for a bicycle having a seat post extending upwardly from a frame of the bicycle, the seat assembly comprising:

a housing member, the housing member having an upper portion and a lower portion, an outer perimeter edge of said upper portion being coupled to said lower portion to form an interior space between the upper portion and the lower portion;

said housing member further having a peripheral edge, said peripheral edge having a generally arcuate back portion and a pair of frontal projections, the frontal projections being spaced with respect to each other whereby the housing member is adapted to permit a scrotum of a user to hang freely between the frontal projections when the user is seated on the housing member;

a cushioning member being positioned in the interior space of the housing member, the cushioning member being positioned between the upper portion and the lower portion;

a spring assembly having a clamping member, the clamping member being adapted for coupling to the seat post of the bicycle;

said spring assembly having a support frame coupled to the lower portion of the housing and a main frame coupled to the clamping member, the spring assembly further having a plurality of cylindrical spring members coupled between the support frame and the main frame;

said support frame having a generally arcuate rear cross member and a rigid elongate perimeter edge member, said perimeter edge member having a pair of frontal protrusion support portions and an inwardly arcuate spacing portion positioned between said frontal protrusions support portions, said perimeter edge member extending outwardly from opposite ends of said rear cross member, said perimeter edge member being positioned such that said rear cross member and said perimeter edge member substantially correspond to and support said peripheral edge of said housing member; and said rear cross member having a pair of spring support members, each spring support member having an aperture extending through said spring support member for coupling a cylindrical spring member to said rear cross member.

7. The bicycle seat assembly of claim 6, further comprising:

said main support frame being coupled to each of said cylindrical spring members opposite said rear cross member; and said main support frame being coupled to said bracing assembly such that said clamping member is positioned beneath said support frame between said rear cross member and said perimeter edge member.

8. The bicycle seat assembly of claim 7, further comprising:

said main frame having a spacing bar extending between said cylindrical spring members, said main frame having a pair of clamp arms, said clamping member being coupled between said clamp arms of said main frame.

9. The bicycle seat assembly of claim 8, wherein said clamping member is pivotally coupled between said clamp arms such that said main frame is adapted for permitting tilting of the main frame relative to the seat post of the bicycle.

10. A bicycle seat assembly for a bicycle having a seat post extending upwardly from a frame of the bicycle, the seat assembly comprising:

a housing member, the housing member having an upper portion and a lower portion, an outer perimeter edge of said upper portion being coupled to said lower portion to form an interior space between the upper portion and the lower portion;

said housing member further having a peripheral edge, said peripheral edge having a generally arcuate back portion and a pair of frontal projections, the frontal projections being spaced with respect to each other whereby the housing member is adapted to permit a scrotum of a user to hang freely between the frontal projections when the user is seated on the housing member;

a cushioning member being positioned in the interior space of the housing member, the cushioning member being positioned between the upper portion and the lower portion;

a spring assembly having a clamping member, the clamping member being adapted for coupling to the seat post of the bicycle;

each of said frontal projections having a generally planar lower face, a rounded distal end, and a generally curved upper face;

said peripheral edge of said housing member having a generally arcuate front section between said frontal projections;

said support frame having a generally arcuate rear cross member and a rigid elongate perimeter edge member, said perimeter edge member having a pair of frontal protrusion support portions and an inwardly arcuate spacing portion positioned between said frontal protrusions support portions, said perimeter edge member extending outwardly from opposite ends of said rear cross member, said perimeter edge member being positioned such that said rear cross member and said perimeter edge member substantially correspond to and support said peripheral edge of said housing member;

a plurality of leaf springs coupled between said rear cross member and said spacing portion of said perimeter edge member of said support frame, said leaf springs being positioned such that they resiliently support an interior area of a surface of said lower portion of said housing;

said support frame further having a bracing assembly extending outwardly from said rear cross member towards said spacing portion of said perimeter edge member, said bracing assembly having a main brace member and a pair of lateral brace members, said lateral brace members extending between said main brace member and said perimeter edge member of said support frame;

said rear cross member having a pair of spring support members, each spring support member having an aperture extending through said spring support member for coupling a cylindrical spring member to said rear cross member;

said main support frame being coupled to each of said cylindrical spring members opposite said rear cross member;

said main support frame being coupled to said bracing assembly such that said clamping member is positioned beneath said support frame between said rear cross member and said perimeter edge member;

said main frame having a spacing bar extending between said cylindrical spring members, said main frame having a pair of clamp arms, said clamping member being coupled between said clamp arms of said main frame; and wherein said clamping member is pivotally coupled between said clamp arms such that said main frame is adapted for permitting tilting of the main frame relative to the seat post of the bicycle.

11. The bicycle seat assembly of claim 6, further comprising:

each of said frontal projections having a generally planar lower face, a rounded distal end, and a generally curved upper face.

12. The bicycle seat assembly of claim 6, further comprising:

said peripheral edge of said housing member having a generally arcuate front section between said frontal projections.

13. The bicycle seat assembly of claim 6, further comprising:

said support frame of said spring assembly further having a plurality of leaf springs extending between a rear portion of said support frame and a front portion of said support frame, said leaf springs being positioned such that they resiliently support an interior area of a surface of said lower portion of said housing.

14. The bicycle seat assembly of claim 9, further comprising:

a plurality of leaf springs coupled between said rear cross member and said spacing portion of said perimeter edge member of said support frame.

* * * * *